United States Patent [19]

Amacker

[11] 4,247,030
[45] Jan. 27, 1981

[54] RACK FOR ALL TERRAIN VEHICLE

[75] Inventor: Joseph A. Amacker, Tallulah, La.

[73] Assignee: Amacker Inc., Tallulah, La.

[21] Appl. No.: 103,993

[22] Filed: Dec. 17, 1979

[51] Int. Cl.³ .......................... B60R 9/00; B62D 61/08
[52] U.S. Cl. ..................................... 224/273; 180/210;
280/153 R; 280/160; 280/769; 297/243;
D12/85; D12/87; D12/126; 224/913
[58] Field of Search ....................... 224/30 R, 32 A, 39,
224/42.31, 42.33, 42.44, 42.45 R, 273, 275, 278;
280/153 R, 154.5 R, 154.5 A, 160, 164, 202, 289
A, 289 G, 291, 760, 769; 297/129, 243, 438,
DIG. 9; 180/210–216; D6/48, 48.1; D12/85,
87, 112, 113, 121, 126, 184–186

[56] References Cited

U.S. PATENT DOCUMENTS

| D. 162,540 | 3/1951 | Hsu | D12/112 |
|---|---|---|---|
| D. 229,986 | 1/1974 | Widgren et al. | D12/85 |
| 553,614 | 1/1896 | Handloser | 224/39 X |
| 578,128 | 3/1897 | Wentworth | 224/37 |
| 650,335 | 5/1900 | Muchow | 280/202 |
| 1,004,975 | 10/1911 | Blackman | 280/769 |
| 1,178,649 | 4/1916 | Koenig | 280/202 X |
| 1,382,942 | 6/1921 | Van Hoose | 280/202 |
| 1,473,956 | 11/1923 | Eyre et al. | 280/289 G |
| 2,158,618 | 5/1939 | Dobrowolski | 280/202 |
| 2,425,892 | 8/1947 | Michaels | 280/760 |
| 2,442,889 | 6/1948 | Deal | 280/760 X |
| 2,870,820 | 1/1959 | Turnipseed | 280/760 |
| 3,776,353 | 4/1971 | Roth | 280/202 X |
| 4,176,771 | 12/1979 | Dubroc, Sr. | 280/289 A X |

FOREIGN PATENT DOCUMENTS

| 11068 | of 1906 | United Kingdom | 280/202 |
|---|---|---|---|
| 182335 | 7/1922 | United Kingdom | 280/202 |
| 156276 | 1/1931 | United Kingdom | 297/129 |

Primary Examiner—Stephen Marcus
Attorney, Agent, or Firm—Wigman & Cohen

[57] ABSTRACT

The invention relates to a rack for a vehicle. The rack comprises a seat for holding goods or a person and side walls for containing the goods or the person on the seat. Carriers for a gun or the like are connected to the side walls. A device is also connected to the side walls for allowing the person to rest his or her leg thereon and also for guarding rear tires of the vehicle from having mud and the like splashed thereon. The rack is mounted to and, preferably, used in combination with an all-terrain type of vehicle.

31 Claims, 4 Drawing Figures

RACK FOR ALL TERRAIN VEHICLE

BACKGROUND OF THE INVENTION

1. Field of the Invention

This invention relates to carriers for articles or a person, in particular, for attachment to the rear of a motor vehicle.

2. Description of the Prior Art

In rugged areas of the United States, such as the bayou country of Louisiana, there are not many good roads and often travel must be made by special types of motorized vehicles. Such vehicles include pick-up trucks with high ground clearance and three-wheeled, one-person, all-terrain motorcycles with so-called fat wheels. However, all of the latter type of motorcycles known to be sold by retail dealers, such as Honda ®, lack the advantage of a carrier attached to the rear of the vehicle like the kind that pick-up trucks have. Although it is known from the prior art that motorcycles and various farm vehicles, such as tractors, have utilized carriers for articles or an additional person attached to the rear thereof, such carriers have been found to be not adaptable for use in combination with all-terrain vehicles, particularly, because of the generally small size of such vehicles. Such prior art carriers are exemplified by U.S. Pat. Nos. 1,004,975, 2,425,892, 2,442,889, and 2,870,820. Therefore, there remains a problem in the prior art to fabricate a carrier for articles or an additional person for attachment to the rear of an all-terrain vehicle.

SUMMARY OF THE INVENTION

The present invention relates to a carrier rack for articles or an additional person for attachment to and for use in combination with a motorized vehicle, preferably, of the all-terrain type.

A primary object of the present invention is to increase the capacity of an all-terrain vehicle to carry articles and to double the number of persons that such a vehicle may carry from one to two.

Another object of the invention is to provide a rack having a holder for carrying a gun or the like.

A further object of the invention is to provide a rack having an element that functions both as a leg rest and as a mud guard for the rear tires of the vehicle.

These and other objects will become readily apparent from the following description of the invention.

DETAILED DESCRIPTION OF THE PREFERRED EMBODIMENTS

Figure 1:
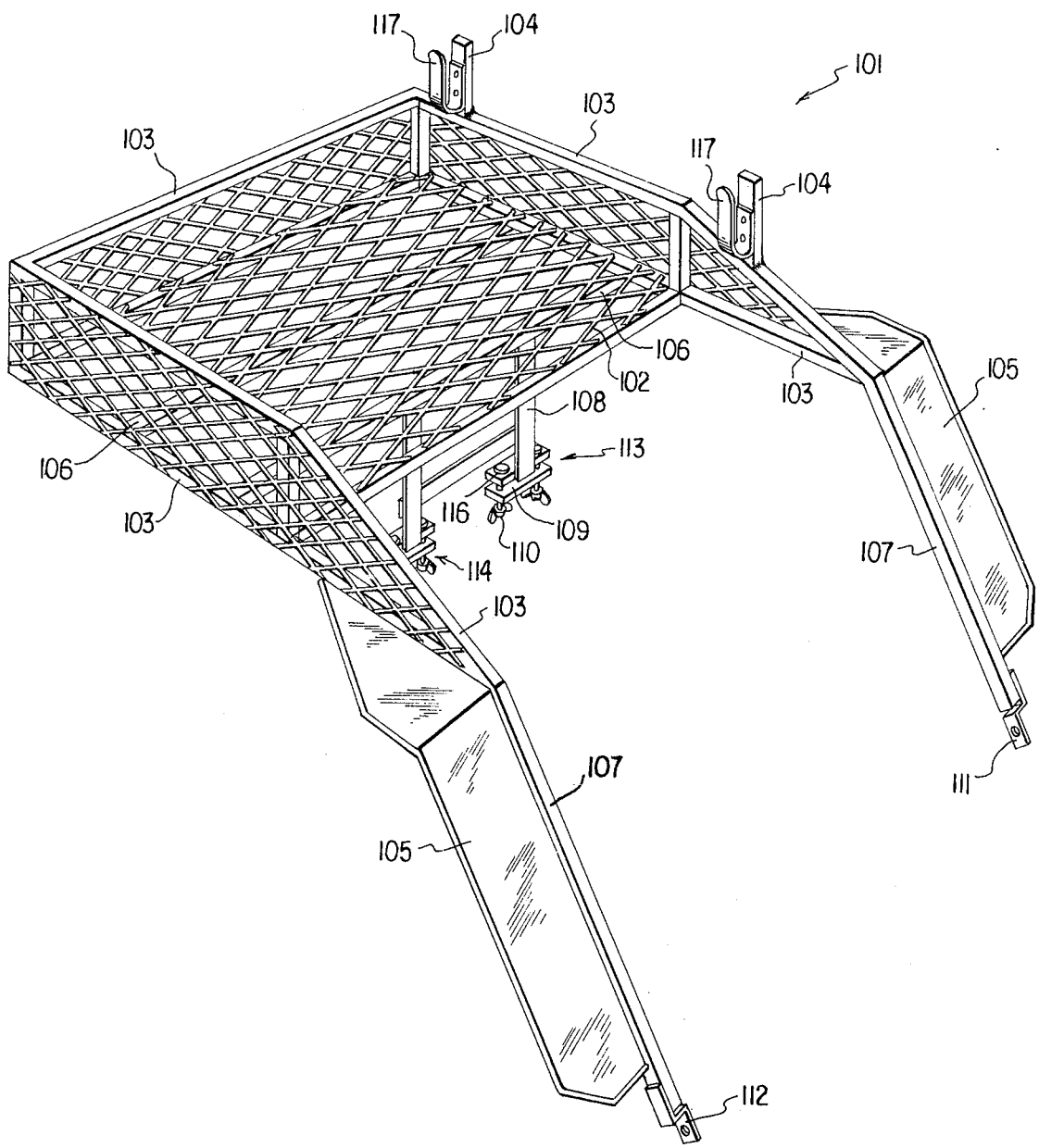
FIG. 1 shows a perspective view of a first embodiment of the invention.
Figures 3, 4:
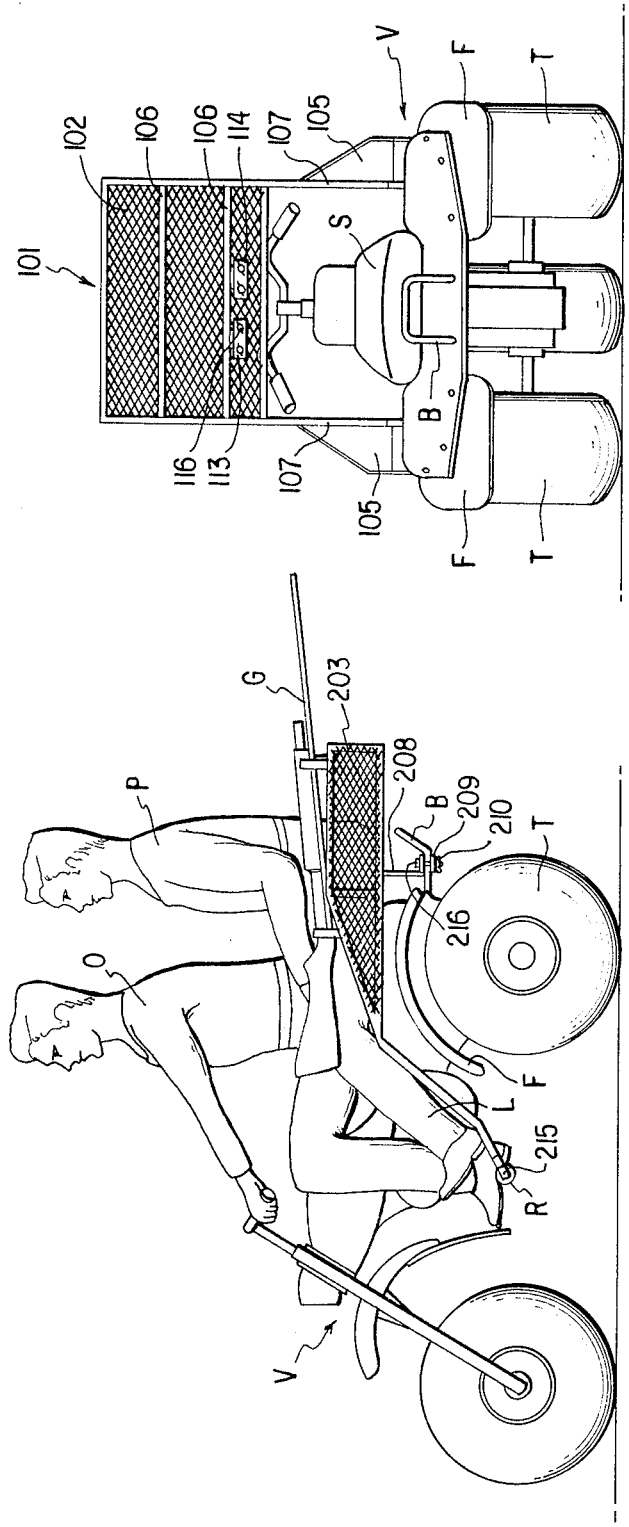
FIG. 3 shows a side elevational view of the second embodiment in combination with an all-terrain vehicle.
FIG. 4 shows a bottom plan view of the first embodiment with the rack pivoted forwardly over the rear of the all-terrain vehicle.

In FIG. 1, a rack 101 constitutes the first embodiment of the invention. A seat 102 is made of expanded metal and holds articles (not shown) or a person P in addition to the operator O shown in FIG. 3. Side walls 103, also made of expanded metal, contain the articles or the person P on the seat 102. As it is clearly shown in FIG. 1, the side walls 103 surround the seat 102 on at least three sides but there is no side wall 103 along the forward edge of the seat 102, thus leaving an opening towards the front of the vehicle. Also, in FIG. 1, a device 104 is connected to the side walls 103 for carrying a gun G, shown in FIG. 3. Other objects like the gun G, such as an umbrella, may alternatively be carried by the device 104. A skirt 105 is connected to the side walls 103 and allows the person P to rest his or her leg L thereon, as shown in FIG. 3. The skirt 105 also serves as an additional guard for the rear tires T, shown in FIGS. 3 and 4, to aid the fender F in preventing mud and the like from being splashed thereon. As it is clearly shown in FIG. 1, the skirt 105 includes a plurality of interconnected, nonparallel planar surfaces. In this first embodiment, there are two such planar surfaces.

As shown in FIGS. 1 and 4, braces 106 reinforce the bottom of the seat 102 while struts 107 reinforce the side of the skirt 105 which functions as a combined leg rest and mug guard. These struts 107 are connected to the inside of the skirt 105 in the first embodiment.

The rack 101 is mounted to a motorized vehicle, such as a three-wheeled, one-person, all-terrain vehicle V shown in FIGS. 3 and 4, at four points 111–114 shown in FIG. 1. Alternatively, points 113 and 114 may be combined into a single point so that only three points are needed to mount the rack 101 to the vehicle V. However, preferably, four mounting points are utilized because of the greater stability of such a mounting arrangement than in the case in which only three mounting points are utilized. Likewise, five or more mounting points may be used but such additional points have been found not to greatly enhance the stability of the mounting arrangement over the preferred four point system.

Mounting points 111 and 112 are metallic elements connected by threaded bolts 215 between the ends of struts 107 and the ends of foot rests R on the vehicle V. As best shown in FIG. 4, the rack 101 pivots forwardly and rotates upwardly in a substantially circular arc about the two mounting points 111 and 112 located at the ends of the foot rests R on the vehicle V so that the operator O may have access to the rear of the vehicle V and may remove the seat S from the vehicle V. A storage area is usually reserved in the vehicle V beneath the seat S.

Mounting points 113 and 114 are metallic elements connected between braces 106 and a bar B by the operator O which is used for lifting the vehicle V by its rear end. The metallic elements at points 113 and 114 constitute plates 108 extending downwardly from braces 106 into the vicinity of bar B. Clamps 109 engage the bar B and are tightened thereto by wingnuts 110 threaded onto bolts 116.

As shown in FIG. 1, the device 104 may be welded or otherwise rigidly connected to the side wall 103. Also, the device 104 may include clips 117 which are slightly resilient in order to carry the gun G or a similar object on the side wall 103.

Figure 2:
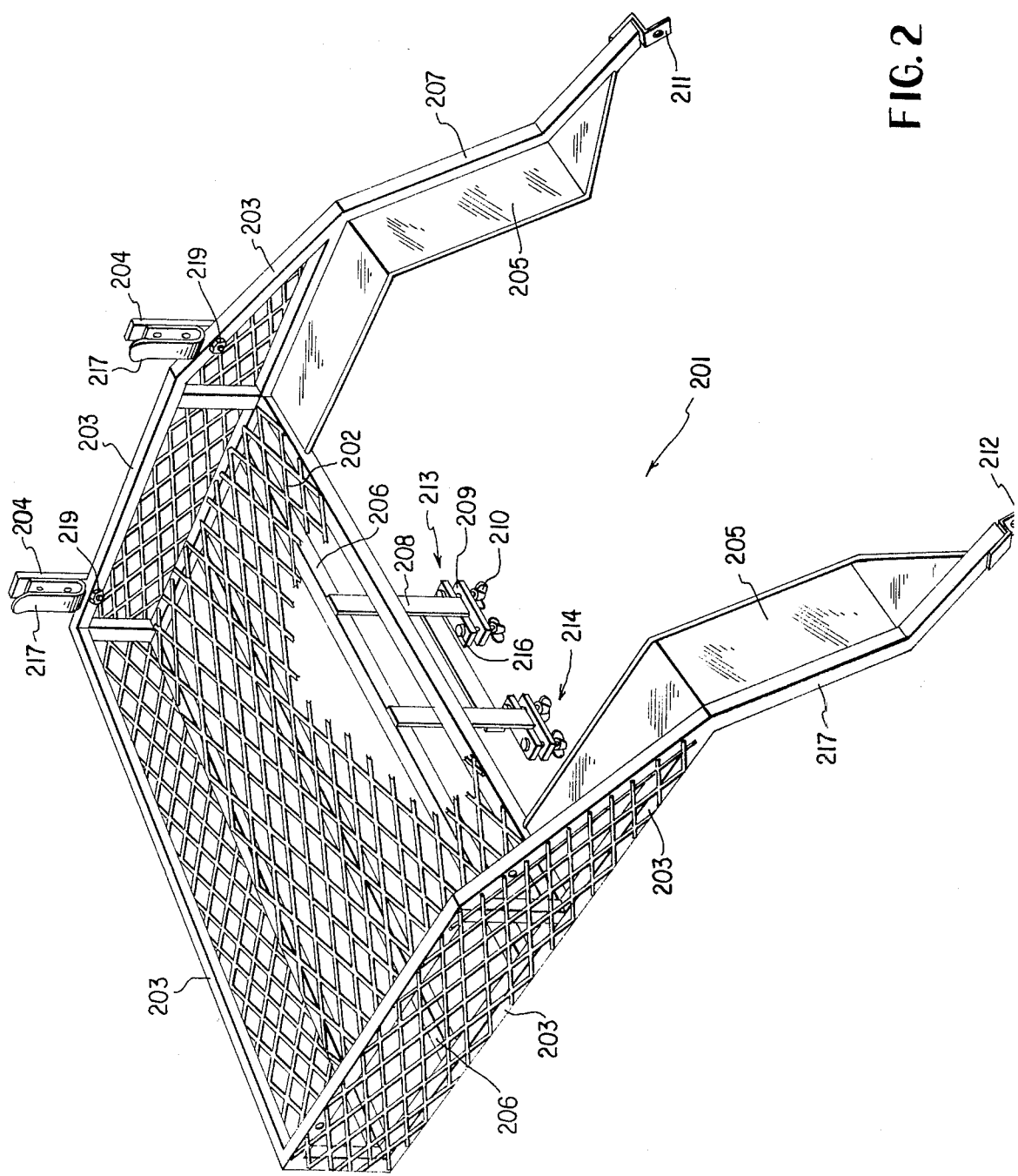
FIG. 2 shows a partially cut-away perspective view of a second embodiment of the invention.

In FIG. 2, a rack 201 constitutes a second embodiment of the invention. Like reference numerals, differing by a factor of 100, indicate identical or substantially similar elements. However, there are important differences between the two embodiments.

First, the seat 202 of the second embodiment is larger than the seat 102 of the first embodiment. The advantage of the larger seat 202 is that the rack 201 will be able to carry more articles and a larger additional person than the rack 101.

Second, the device 204 of the second embodiment is pivotably connected by nut and bolt arrangement 219 to the side wall 203, while the device 104 of the first embodiment is welded or otherwise rigidly connected to the side wall 103. The advantage of the pivotable connection is that the device 204 may be rotated out of the way when it is not in use by moving it from a substantially upright standing position, best shown in FIG. 2, to a position substantially along the side of the side wall 203. Although clips 217 are shown in FIG. 2 on the inside of side wall 203, they could be also arranged on the outside of side wall 203 in order to better facilitate their rotation totally out of the way.

Third, the struts 207 are connected to the outside of the skirts 205 in the second embodiment whereas the struts 107 are connected to the inside of the skirts 105 in the first embodiment. Thus, the rack 201 of the second embodiment is no wider from skirt to skirt than the rack 101 of the first embodiment but rack 201 has a larger area for its seat 202 than rack 101 has for its seat 102.

Fourth, the skirt 205 includes a plurality of interconnected, nonparallel planar surfaces. As it is clearly shown in FIG. 2, there are three such planar surfaces in this second embodiment.

The foregoing two preferred embodiments are considered as illustrative only. Numerous modifications and changes will readily occur to those skilled in the pertinent art.

What I claim is:

1. A rack for a wheeled vehicle comprising:
   a. a seat means for holding articles or a person;
   b. side wall means for containing said articles or the person;
   c. means, connected to the side wall means, for allowing the person to rest his or her leg thereon and also for preventing mud and the like splashed thereon; and
   d. strut means for reinforcing the leg rest and mud guard means.
2. The rack, according to claim 1, further comprising: means for mounting the rack to the vehicle.
3. The rack, according to claim 2, further comprising: brace means for reinforcing the bottom of the seat means.
4. The rack, according to claim 3, wherein: said mounting means are connected to the vehicle at at least three points.
5. The rack, according to claim 4, wherein: said mounting means are connected to the vehicle at four points.
6. The rack, according to claim 4, wherein: said mounting means are connected at two points to ends of said strut means.
7. The rack, according to claim 6, wherein: said two points, where the mounting means are connected to the ends of said strut means, are located at ends of foot rests on the vehicle.
8. The rack, according to claim 7, wherein: said rack pivots forwardly and rotates upwardly in a substantially circular arc about the two points located at the ends of the foot rests on the vehicle so that an operator may have access to the rear of the vehicle and may remove a seat from the vehicle.
9. The rack, according to claim 4, wherein: said mounting means are connected at two points to said brace means.
10. The rack, according to claim 9, wherein: said two points, where the mounting means are connected to said brace means, are located on a bar at the rear of the vehicle.
11. The rack, according to claim 2, wherein: said strut means are connected to the inside of the leg rest and mud guard means.
12. The rack, according to claim 2, wherein: said strut means are connected to the outside of the leg rest and mud guard means.
13. The rack, according to claim 1 or 11 or 12, wherein: said leg rest and mud guard means is a skirt.
14. The rack, according to claim 13, wherein: said skirt includes at least one planar surface.
15. The rack, according to claim 13, wherein: said skirt includes a plurality of interconnected, nonparallel planar surfaces.
16. The rack, according to claim 15, wherein: said planar surfaces are two in number.
17. The rack, according to claim 15, wherein: said planar surfaces are three in number.
18. The rack, according to claim 2, wherein: said rack is used in combination with an all-terrain type of vehicle.
19. The rack, according to claim 18, wherein: said all-terrain type of vehicle is a motorcycle.
20. The rack, according to claim 1, wherein: said seat means is made of expanded metal.
21. The rack, according to claim 1 or 20, wherein: said side wall means is made of expanded metal.
22. The rack, according to claim 1, further comprising: means, connected to the side wall means, for carrying a gun or the like.
23. The rack, according to claim 22, wherein: said gun carrying means are welded or otherwise rigidly connected to the side wall means.
24. The rack, according to claim 22, wherein: said gun carrying means are pivotably connected to the side wall means so that they may be rotated from a substantially upright standing position to a position substantially along the side of said side wall means.
25. The rack, according to claim 23 or 24, wherein: said gun carrying means include clips.
26. The rack, according to claim 25, wherein: said clips are slightly resilient.
27. The rack, according to claim 1, wherein: said side wall means surrounds the seat means on at least three sides.
28. The rack, according to claim 1 or 27, wherein: said side wall means leaves an opening towards the front of the vehicle.
29. A rack for an all terrain vehicle including a front wheel, a pair of rear wheels, a seat for holding a driver and a pair of foot rests for the driver, said rack comprising:
   seat means positioned behind the driver's seat and secured to said vehicle for carrying articles and/or an additional passenger;
   a pair of side walls and a rear wall secured to said seat means for containing said articles and/or said passenger;
   leg support means extending forwardly of each of said side walls for supporting the legs of said passenger positioned on said seat means, said leg support means having a widened portion which is located over said rear wheels in fender-like fashion; and mounting means at the terminal portions of said leg support means for securing said rack to each of said foot rests of said vehicle.

30. The rack according to claim 29 wherein each of said leg support widened portions extends downwardly from said seat means towards said mounting means and is carried by a strut, said strut being secured to said mounting means.

31. The rack according to claim 30 further including an additional mounting element positioned rearwardly of said mounting means for quickly securing and releasing said seat means with respect to said vehicle without the need for special tools, whereby when said rearward mounting element is released the rack is capable of being rotated upwardly about said forward mounting means.

* * * * *